(12) United States Patent
Abali et al.

(10) Patent No.: US 9,098,425 B2
(45) Date of Patent: Aug. 4, 2015

(54) IMPLEMENTING USER MODE FOREIGN DEVICE ATTACHMENT TO MEMORY CHANNEL

(71) Applicant: International Business Machines Corporation, Armonk, NY (US)

(72) Inventors: Bulent Abali, Tenafly, NJ (US); Michele M. Franceschini, White Plains, NY (US); Luis A. Lastras-Montano, Cortlandt Manor, MA (US)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 13/738,035

(22) Filed: Jan. 10, 2013

(65) Prior Publication Data

US 2014/0195765 A1     Jul. 10, 2014

(51) Int. Cl.
   *G06F 12/10*       (2006.01)
   *G06F 12/14*       (2006.01)
   *G06F 11/10*       (2006.01)

(52) U.S. Cl.
   CPC ............ *G06F 12/10* (2013.01); *G06F 11/1004* (2013.01); *G06F 11/1008* (2013.01); *G06F 12/1081* (2013.01); *G06F 12/145* (2013.01); *G06F 2212/206* (2013.01)

(58) Field of Classification Search
   USPC .................................. 711/100, 154, 200, 209
   See application file for complete search history.

(56) References Cited

U.S. PATENT DOCUMENTS

| | | | |
|---|---|---|---|
| 2004/0243745 A1* | 12/2004 | Bolt et al. ........................ | 710/68 |
| 2008/0222371 A1* | 9/2008 | Caulkins ........................ | 711/154 |
| 2009/0300274 A1 | 12/2009 | Luo et al. | |
| 2011/0131366 A1 | 6/2011 | Nakai et al. | |
| 2011/0225390 A1 | 9/2011 | Mac Williams et al. | |

FOREIGN PATENT DOCUMENTS

| | | |
|---|---|---|
| WO | WO2009123728 A1 | 8/2009 |
| WO | WO2009116716 A1 | 9/2009 |

OTHER PUBLICATIONS

Sangyeun Cho et al, "Active Disk Meets Flash: A Case for Intelligent SSDs", Nov. 2011.

* cited by examiner

*Primary Examiner* — Tuan Thai
(74) *Attorney, Agent, or Firm* — Joan Pennington

(57) ABSTRACT

A method, system and computer program product are provided for implementing attachment of a user mode foreign device to a memory channel in a computer system. A user mode foreign device is attached to the memory channel using memory mapping of device registers and device buffers to the processor address space. The storage capacity on the device is doubly mapped in the address space creating separate control and data address spaces to allow user mode processes to control the device therefore eliminating the need for software system calls. A processor Memory Management Unit (MMU) coordinates multiple user processes accessing the device registers and buffers providing address space protection of each of interfaces, shifting device protection to the processor MMU from system software.

16 Claims, 12 Drawing Sheets

IMPLEMENTING USER MODE FOREIGN DEVICE ATTACHMENT TO MEMORY CHANNEL

FIELD OF THE INVENTION

The present invention relates generally to the data processing field, and more particularly, relates to a method, system and computer program product for implementing attachment of user mode foreign devices to a processor memory channel in a computer system.

DESCRIPTION OF THE RELATED ART

In a state of the art computer system, a processor memory channel is normally reserved for attaching only Dynamic Random Access Memory (DRAM) devices and user mode foreign devices are attached to an Input/Output (I/O) channel that is attached to the processor via an I/O adapter or I/O bridge. Here, the term "user mode" refers to non-privileged software applications, that is other than system software such as operating systems which are in charge of managing the hardware. The term foreign device refers to I/O peripherals originally not part of the computer system, but may be later attached to the computer system through one of the I/O channels such as the PCIExpress (PCIe) bus.

FIGS. 1-3 illustrate a prior art computer system 100 includes one or more processors 102 including at least one Error Correcting Codes (ECC) circuit 104, a plurality of Dynamic Random Access Memory (DRAM) modules 106, such as Dual In-line Memory Modules (DIMM) typically using the DDR protocol or similar protocol, attached to a respective processor memory channel 110, such as DDR3 or DDR4 channels in state of the art. Some DRAM 106 connections to the processor memory channel 110 may be permuted occasionally using bit swizzling 112, 114 by the designers of the computer systems.

Data stored in DRAM 106 sometime incur errors with small probability due to environmental factors such as electromagnetic radiation, electrical noise and hardware malfunction. However, software processes running on the processor 102 expect the data written to the memory to be read back the same, without errors. Error Correcting Codes (ECC) protect data in memory in an attempt to detect and correct errors. ECC rely on redundant information. ECC circuitry 104 appends additional, redundant, bits to the original data word, which is referred to as check-bits. Specifically, when processor 102 writes data to DRAM 106, the ECC circuitry 104 on the processor 102 appends check bits to the original data and stores them together in the DRAM module 106. For example, 8 redundant check-bits per 64 bit of original data may be used. When processor 102 reads back what was written earlier, the ECC circuitry 104 checks the consistency of the check-bits and the original data. An inconsistency, for example, a mismatch, indicates that the original data or the check-bits have been corrupted while in the memory 106 or during transmission to/from the memory. Small number of errors in a data word can be corrected by the ECC circuitry 104.

If DRAM errors in a data word exceed design thresholds, an uncorrectable error, that is a data corruption, is said to occur. The ECC circuitry 104 detects most uncorrectable errors with very high probability. When an uncorrectable error occurs, the ECC circuitry 104 asserts a processor interrupt called a Machine Check Exception (MCE) to notify the system software that the data read from memory cannot be trusted.

The ECC algorithm and organization in a particular processor 102 is typically non-public information. While the mathematical theory of ECC algorithm may be known publically, the actual parameters of the algorithm, for example location of the check bits may not be known at least at the memory device design time. Since the processor 102 handles ECC internally, operational details of the ECC circuitry 104 is in a black box, neither known nor necessary for the software processes running on the processor.

Wires within a memory channel 110 may be permuted occasionally by bit swizzling 112, 114 may permute or cross the logical labels of signals. For example, bit number N on the processor memory port may be connected to a different bit number M on the DRAM module port and vice versa. Bit-swizzling 112, 114 is done due to routing constraints on the printed circuit boards and silicon carriers carrying the processor chips and DRAM modules. Even within a single computer system 100, bit swizzling may be done differently between different channels 110 and different connections to DRAM 106. For example, in FIG. 1 bit swizzling 112 in one DRAM module 106 crosses the leftmost two wires whereas another bit swizzling 114 in DRAM module 106 crosses the rightmost two wires.

Bit swizzling 112, 114, permuting bits in a data word, does not confuse the processor 100. This is because the same bundle of swizzled wires are used for reading and writing the DRAM 106 the data word X that processor 102 intended to store to the memory which was then swizzled before the actual write will be un-swizzled during reading of the same data word, therefore the processor always retrieves the original value of data word X.

As shown in FIGS. 1-3, the prior art computer system 100 includes an Input/Output (I/O) bridge or adapter 120 and an Input/Output (I/O) channel 130, such as peripheral component interconnect (PCI) express or PCIe, attached to a flash storage 140 and a Field Programmable Gate Arrays (FPGA) 150, such as a FPGA accelerator 150.

In the prior art computer system 100, input/output processing is provided using I/O bridge adapter 120 and the I/O channel 130 for flash storage 140 and the FPGA accelerator 150. In a state of the art computer system, all peripheral devices such as illustrated in the prior art computer system 100, such as flash storage 140, disk storage, network adapters, keyboard, mouse and peripheral computing devices such as FPGA accelerators 150 connect to the system through the I/O channel 130. The I/O channel 130 and the peripheral devices 140, 150 on I/O channel 130 are privileged and shared resources. Therefore, the system software including operating system 200 protects the I/O channel 130 and the peripheral devices 140, 150 from unauthorized access by non-privileged user mode software processes. This requires user mode software 202, 204 to make a system call indicated at a respective line 206, 208 asking the system software to act on its behalf in a coordinated and safe manner. System software are typically the file system 212, kernel 214, operating system 200, hypervisor 216, and device drivers 220.

FIG. 2 illustrates the flow of control from user mode software to the actual access to devices present on the I/O bus. Multiple user mode processes 202, 204 request access to a device, such as flash storage 140, or FPGA 150 by a system call 206, 208. The file system software module 212 in the operating system (OS) 200 and hypervisor 216 will verify that processes 202, 204 indeed have access rights to the requested files or devices. The request may flow through various system software layers, 212, 214 216, and 220 finally arriving to the actual device 140 or 150 in FIG. 2. Processing a single I/O request may result in tens of thousands of processor instructions being executed.

In the prior art computer system 100, memory is also a shared resource just as the I/O system. Different regions of the memory may be reserved for different software processes, which are typically not allowed to access each others regions. However, unlike the I/O system, memory accesses are expected to be very fast, and expected to be completed in a single instruction execution time.

As illustrated in FIG. 3 in the prior art computer system 100, a memory management unit (MMU) 302 enforces the access rights to the regions of DRAM memory 106. Smallest unit of protection in memory is typically a "page" which is usually 4 Kbyte to 64 Kbytes large with multiple pages 304, 306, 308 shown in DRAM 106 that is connected by address bus 310 of the memory channel 110 to the MMU 302. System software maintains a set of page tables that lists protection attributes of each page in the memory, that control which software process is allowed to access which set of pages and so on. For example, software process A 324 may have access rights to the page 304 and not pages 306, 308, and process B 326 may have access rights to the page 306 and not pages 304, 308 and software process C 328 may have access rights to page 308 and not pages 304, 306. These page protections are enforced by the MMU 302 hardware provided with the processor 102. Since state of the art MMUs 302 are implemented in hardware, access rights checking is completed very fast, typically with time delays comparable to single instruction execution.

In densely packaged computing systems, there may be insufficient physical space for I/O adapters. For example, blade servers and 1.75 inch height rack servers typically have only one or two slots for I/O adapters. While such servers may have, for example, a total of 24 memory (DIMM) slots on the memory channels.

In some computing systems, the data bandwidth through the I/O channels may be insufficient as compared to the memory channels, because there are fewer I/O channels than memory channels, and furthermore, each I/O channel typically has fewer wires than the memory channel. A memory channel includes a bundle of electrical signals, typically 72 data signals plus address and control signals per bundle, and typically there will be 2 to 4 memory channels with 3 DIMMS per channel and in a two processor system there may be up to 24 DIMMs in the system. The I/O channel typically includes substantially smaller bundle of electrical wires, such as the PCIe channel.

In some computing systems, the communication latency through the I/O channels may be insufficient as compared to the memory channels, because the I/O requests have to travel through several layers of software to verify access rights to the files and devices, therefore possibly requiring execution of tens of thousands of instructions. Whereas, memory access latency is much shorter, for example, in the order of one instruction latency, due to the protection mechanisms implemented in hardware, including the Memory Management Unit (MMU).

A need exists for an effective mechanism to enable attachment of user mode foreign devices or non-DRAM devices to memory channels in a computer system, while only Dynamic Random Access Memory (DRAM) devices attach to the memory channels in state of the art.

SUMMARY OF THE INVENTION

Principal aspects of the present invention are to provide a method, system and computer program product for implementing attachment of a user mode foreign device to a memory channel. Other important aspects of the present invention are to provide such method, system and computer program product substantially without negative effects and that overcome many of the disadvantages of prior art arrangements.

In brief, a method, system and computer program product are provided for implementing attachment of a user mode foreign device to a memory channel in a computer system. A user mode foreign device is attached to the memory channel using memory mapping of device registers and device buffers to the processor address space. The storage capacity on the device is doubly mapped in the address space creating separate control and data address spaces to allow user mode processes to control the device therefore eliminating the need for software system calls. A processor Memory Management Unit (MMU) coordinates multiple user processes accessing the device registers and buffers providing address space protection, shifting device protection to the processor MMU from system software.

In accordance with features of the invention, attaching I/O devices to the memory channels enabled by the invention substantially eliminates the need for many I/O adapter slots in server systems.

In accordance with features of the invention, attaching high bandwidth I/O devices to the memory channels enabled by the invention substantially avoids the insufficient bandwidth limitations of I/O channels as compared to the memory channels.

In accordance with features of the invention, attaching I/O devices to the memory channels enabled by the invention substantially avoids the communication latency limitations of I/O channels as compared to the memory channels.

In accordance with features of the invention, the user mode foreign device discovers processor ECC algorithm parameters and bit-swizzling permutations, enabling the device to communicate correctly with the processor and user mode software.

In accordance with features of the invention, the user mode foreign device is able to generate its own ECC bits and append to the data.

In accordance with features of the invention, the user mode foreign device is enabled to un-swizzle the signals on memory channel wires.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method, system and computer program product are provided for implementing attachment of user mode foreign devices to a memory channel in a computer system.

In accordance with features of the invention, the method, system and computer program product provide thermal mitigation for mirrored memory devices sustaining memory performance without throttling memory traffic.

Figure 1:
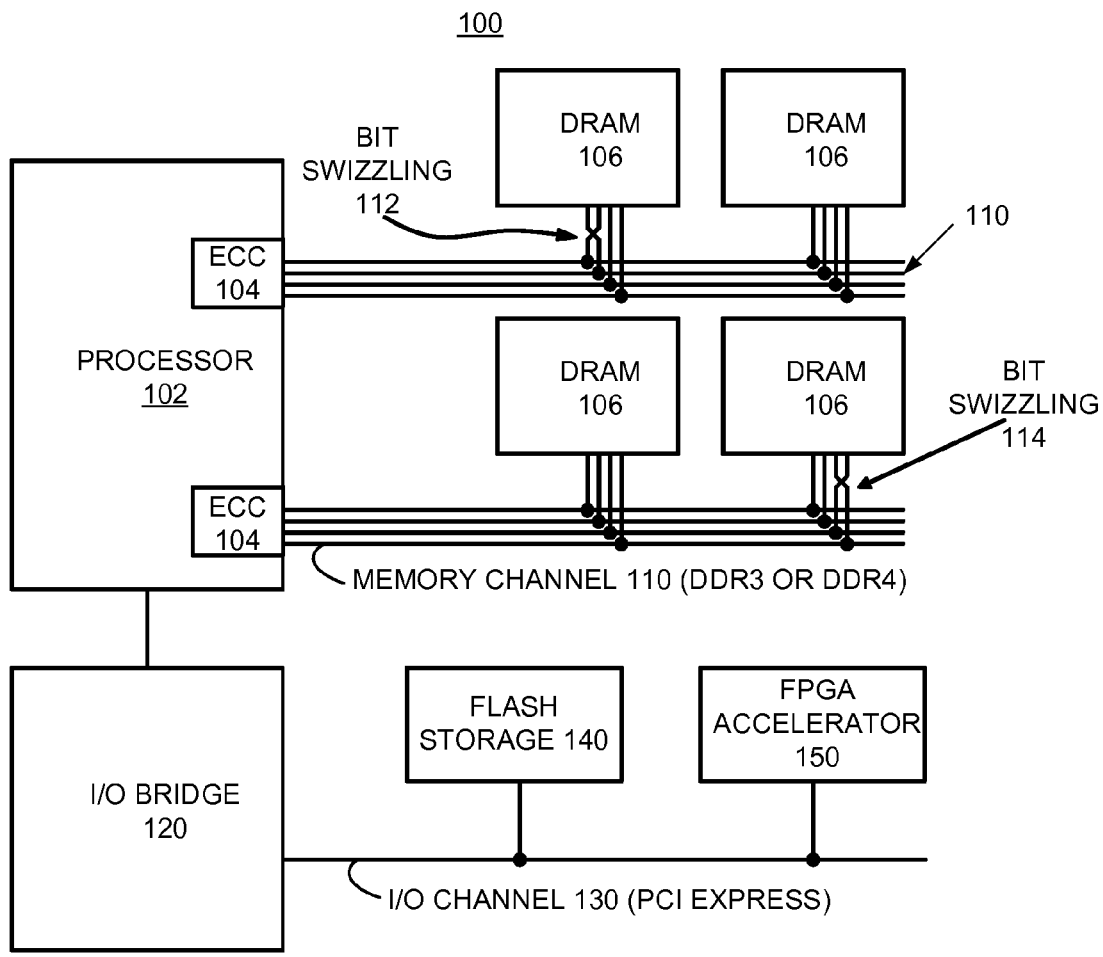
FIGS. 1-3 illustrates an example prior art computer system including user mode foreign devices attached to an Input/Output (I/O) channel attached to a processor via an I/O adapter or I/O bridge.
Figure 2:
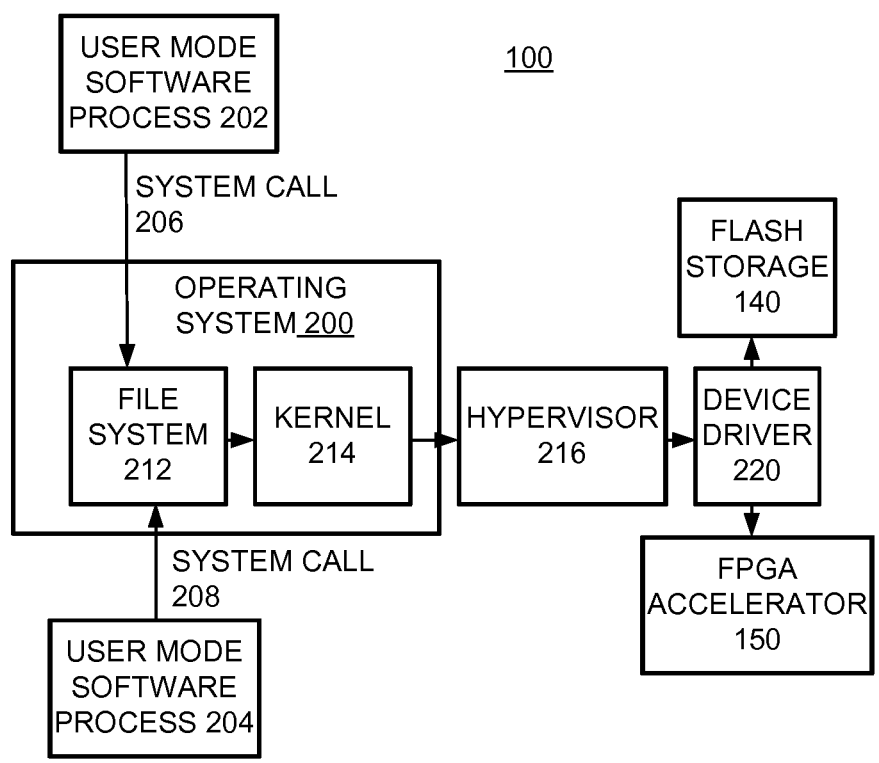
Figure 3:
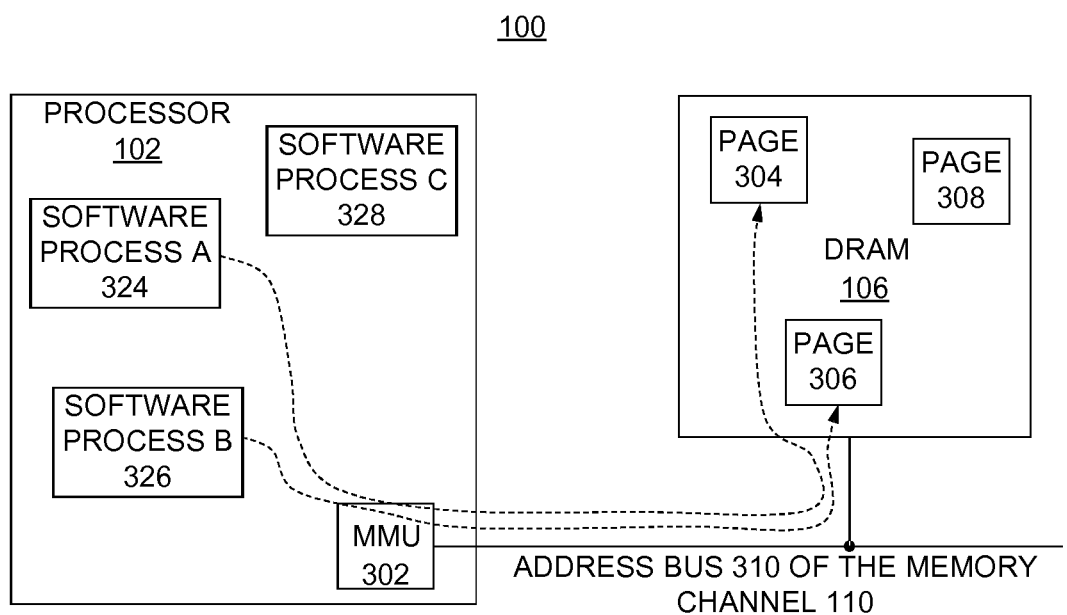
Figure 4:
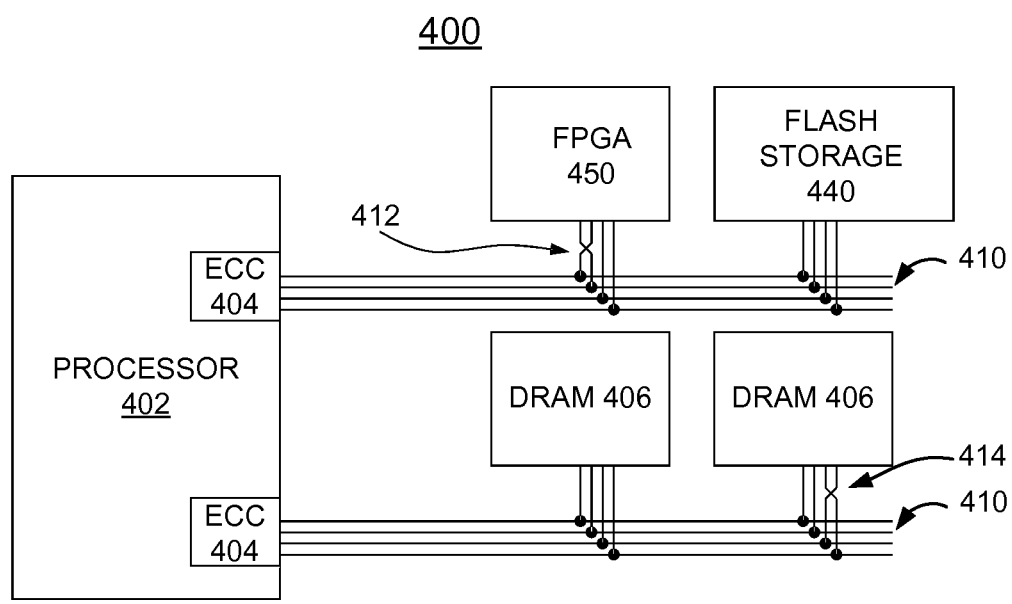
FIG. 4 is a block diagram representation illustrating an example system for implementing attachment of user mode foreign devices to a memory channel in accordance with the preferred embodiment.

Having reference now to the drawings, in FIG. 4, there is shown an example computer system generally designated by the reference character 400 for implementing attachment of user mode foreign devices to a memory channel in accordance with the preferred embodiment.

Computer system 400 includes one or more processors 402 or programmable central processing units (CPUs) 402 including at least one Error Correcting Codes (ECC) circuit 404, a plurality of Dynamic Random Access Memory (DRAM) modules 406, such as Dual In-line Memory Modules (DIMM) typically using the DDR protocol or similar protocol, attached to a respective processor memory channel 410, such as DDR3 or DDR4 channels in state of the art. Some connections to the processor memory channel 410 are permuted using bit swizzling 412, 414.

Computer system 400 includes one or more user mode foreign devices attached to a memory channel 410. As shown, computer system 400 includes a flash storage 440 and a Field Programmable Gate Array (FPGA) 450, such as a FPGA accelerator 450 attached to the processor memory channel 410 using bit swizzling 412 with the connection to the FPGA 450.

Computer system 400 is shown in simplified form sufficient for understanding the present invention. The illustrated computer system 400 is not intended to imply architectural or functional limitations. The present invention can be used with various hardware implementations and systems and various other internal hardware devices, for example, multiple main processors.

Figure 5:
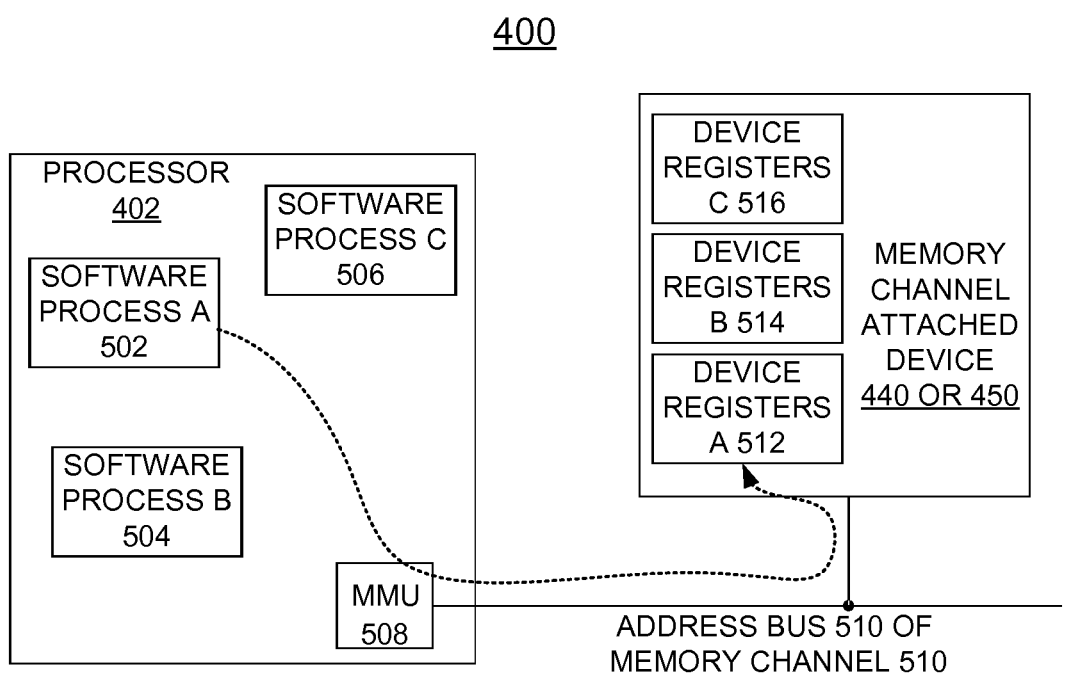
FIG. 5 is a diagram illustrating address mapping for data movement using multiple device control registers and buffers on the user mode foreign device and protecting the device control registers and buffers using a processor Memory Management Unit (MMU) in the example system of FIG. 4 in accordance with the preferred embodiment.

Referring to FIG. 5, there is shown address mapping for data movement in the illustrated computer system 400 using multiple device control registers and buffers on the memory channel user mode foreign device 440, or 450. A plurality of software processes A, 502; B, 504; and C, 506 are protected using a processor Memory Management Unit (MMU) 508 in the example system 400 in accordance with the preferred embodiment. The memory channel user mode foreign device 440, or 450 implements multiple copies of control registers and data registers/buffers A, 512; B, 514; and C, 516. An address bus 510 connects the software processes A, 502; B, 504; and C, 506 via MMU 508 with associated device registers, A, 512; B, 514; and C, 516 on the user mode foreign device 440, or 450. There are as many copies of these device control/data interfaces A, 512; B, 514; and C, 516 as the number of software processes A, 502; B, 504; and C, 506 expected to access the device 440, or 450 at once. For example, in one embodiment of the invention there may be thousands such interfaces as A, 512; B, 514; and C, 516 on the device 440, or 450 each corresponding to one software process A, 502; B, 504; and C, 506. The memory channel user mode foreign device 440, or 450 will be responsible for coordinating and prioritizing requests coming from different interfaces. The problem solved by this invention is that the address space protection of each of interfaces is enforced by the MMU 508, therefore the burden of device protection is shifted from the system software to hardware of the processor MMU 508. MMU 508 enforces the access rights to the regions of memory channel user mode foreign device 440, or 450.

Figure 6A:
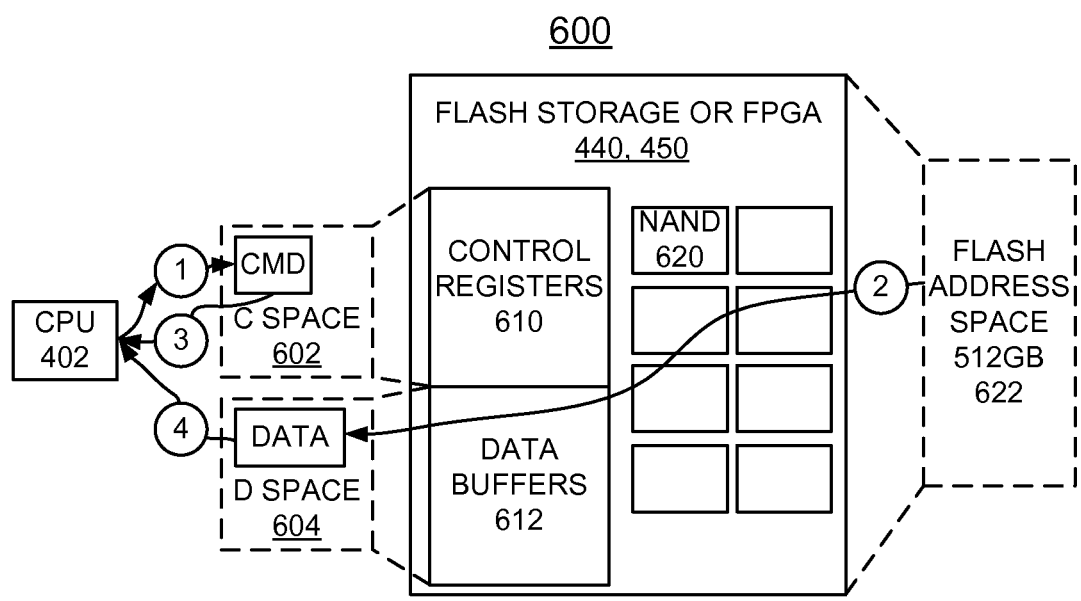
FIG. 6A is a diagram illustrating a data movement method using an I/O model in the example system of FIG. 4 in accordance with the preferred embodiment.
Figure 6B:
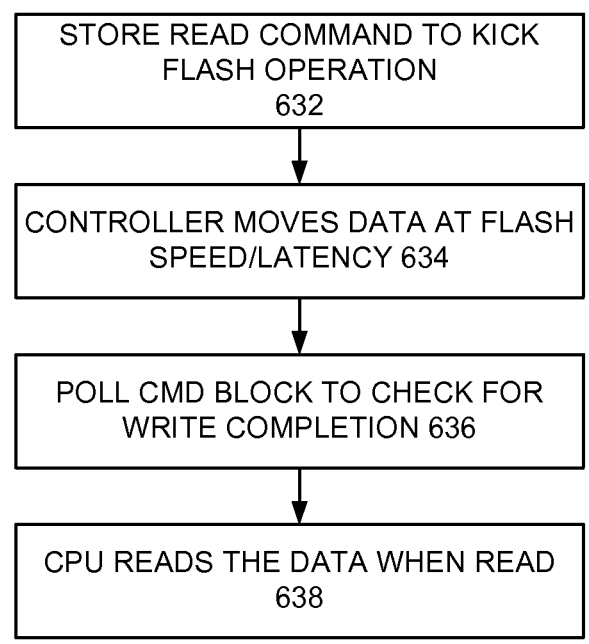
FIG. 6B is a flow chart illustrating exemplary operations for the data movement method of FIG. 6A in accordance with the preferred embodiments.

Referring to FIGS. 6A and 6B, in FIG. 6A there is shown a diagram illustrating a data movement method generally designated by the reference character 600 using an I/O model in the example system 400 in accordance with the preferred embodiment. In FIG. 6B there is shown a flow chart illustrating exemplary operations for the data movement method 600 of FIG. 6A in accordance with the preferred embodiments.

As illustrated in the data movement method 600 of FIG. 6A, a device interface dedicated to a single software process is partitioned into two separate address spaces called a control space C space 602 and a data space D space 604 including control registers 610 and data buffers 612 in memory channel user mode foreign device 440, or 450, for example including NAND flash 620 and a flash address space 622, such as 512 GB address space 622. As indicated at 1 in FIG. 6A, and at a block 632 in FIG. 6B, CPU 402 storing a read command to kick or start flash operation. As indicated at 2 in FIG. 6A, and at a block 634 in FIG. 6B, CPU controller moving data to the flash address space 622 at flash speed or latency. As indicated at 3 in FIG. 6A, and at a block 636 in FIG. 6B, CPU polls the command block in C space 602 to check for write completion. As indicated at 4 in FIG. 6A, and at a block 638 in FIG. 6B, CPU 402 reads the data when read.

Figure 6C:
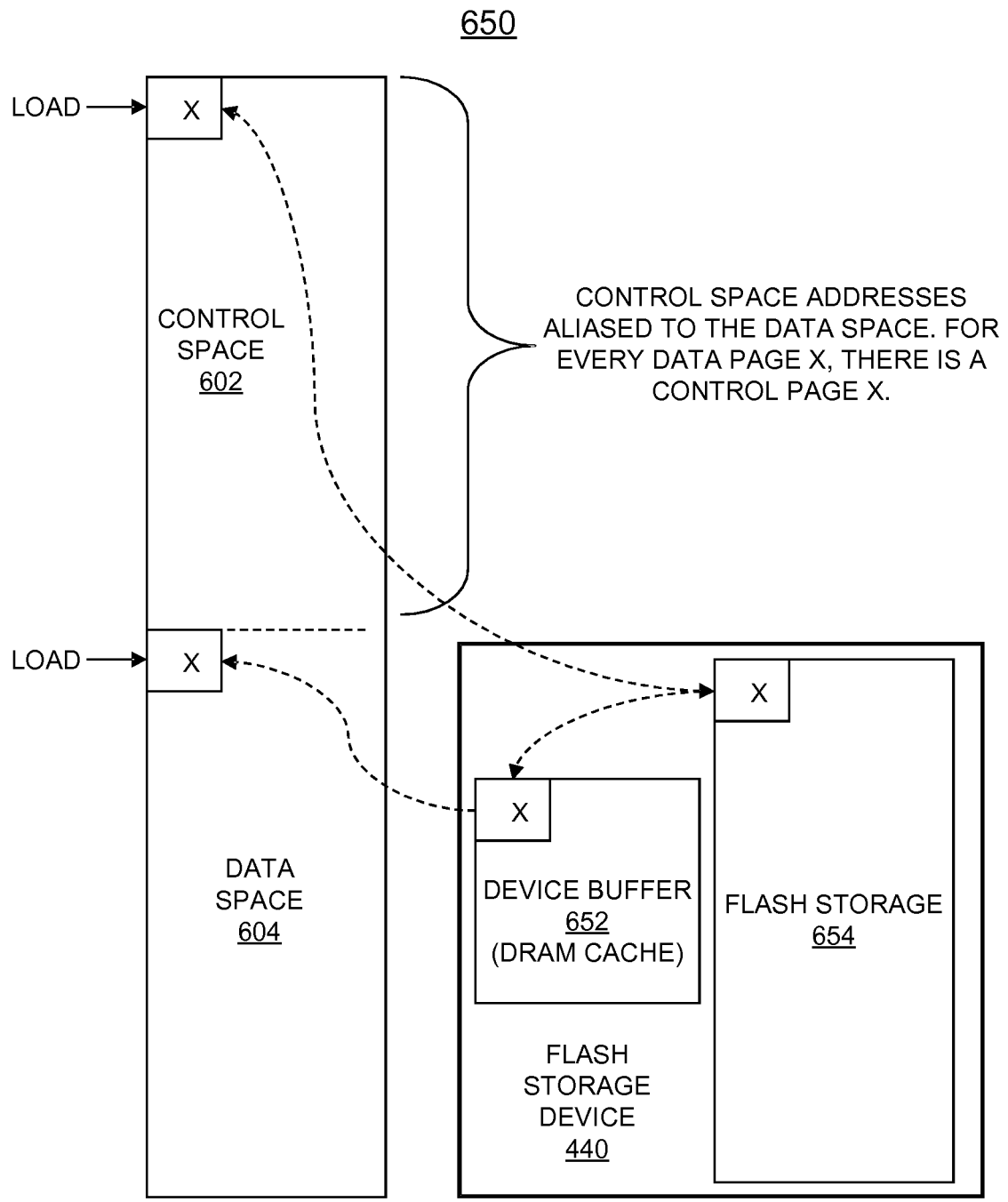
FIG. 6C is a diagram illustrating the data movement using touch/load/store model in the example system of FIG. 4 in accordance with the preferred embodiment.

Referring to FIG. 6C there is shown a diagram illustrating a data movement method generally designated by the reference character 650 using touch/load/store model with address space size twice the size of flash storage capacity in the example system 400 in accordance with the preferred embodiment. The flash storage device 440 includes a device buffer 652, such as a DRAM cache or another high speed memory technology, provided with flash storage 654. The device buffer 652 is the high-speed buffer that obeys the DRAM timings expected of the device 440, and the actual flash storage 654 that is not directly attached to the memory channel. Processor LOAD instruction is applied to the command control space C space 602 implements a TOUCH function that prefetches data in the device buffer 652. Processor STORE instructions manage the device buffer 652 such as locking the data page in place in the buffer or cache. LOAD result also indicates if the data has arrived yet from flash storage 654 to the device buffer 652. Processor LOAD/STORE instructions are applied to the data space D space 604 access the actual data after TOUCH has completed. In control space 602, control space addresses are aliased to the data space. For every data page X, there is a control page X, where individual flash pages can be mapped to the user space. CPU page tables/TLB protects individual flash pages. Therefore there is not need for a kernel mode driver, hypervisor and the like, to serialize and protect the I/O device 440.

Accesses to the control space 602, such as memory loads and stores issued from the processor 402 manage the data movement between the high speed device buffer 652 and the flash storage 654. In a preferred embodiment of the invention, the device 440 implements a data page TOUCH operation via reading an address in the control space 602. When address X in the control space 602 is read, it actually makes a request to the device 440 to bring the data page corresponding to X in to the high speed device buffer 652, and make it accessible through the data space 604. The value read from address X tells if the data page is present in the data space 604 or not. For example, a value of 0 indicates that the data page is not present in the data space 604. On a second read of the control space address X, if the value is non-zero it indicates that the data page has arrived to the high-speed buffer 652 and therefore may be read and written with the timing delays expected by the processor 402.

Other data management functions such as locking a page in the high-speed buffer 652 and writing it back to the flash storage 654 may be implemented through the control space method of this invention. As stated, the problem solved by this method is that the address space protection is enforced by the MMU 508, therefore the burden of device protection and data access rights management is shifted from the system software to the processor's MMU hardware. MMU 508 can protect millions to billions of pages individually at once and without any software involvement. Therefore, multiple user mode software processes can access different parts of the device 440, or 450, for example different addresses in flash Storage 654, which they are permitted to without making expensive system calls.

Figure 6D:
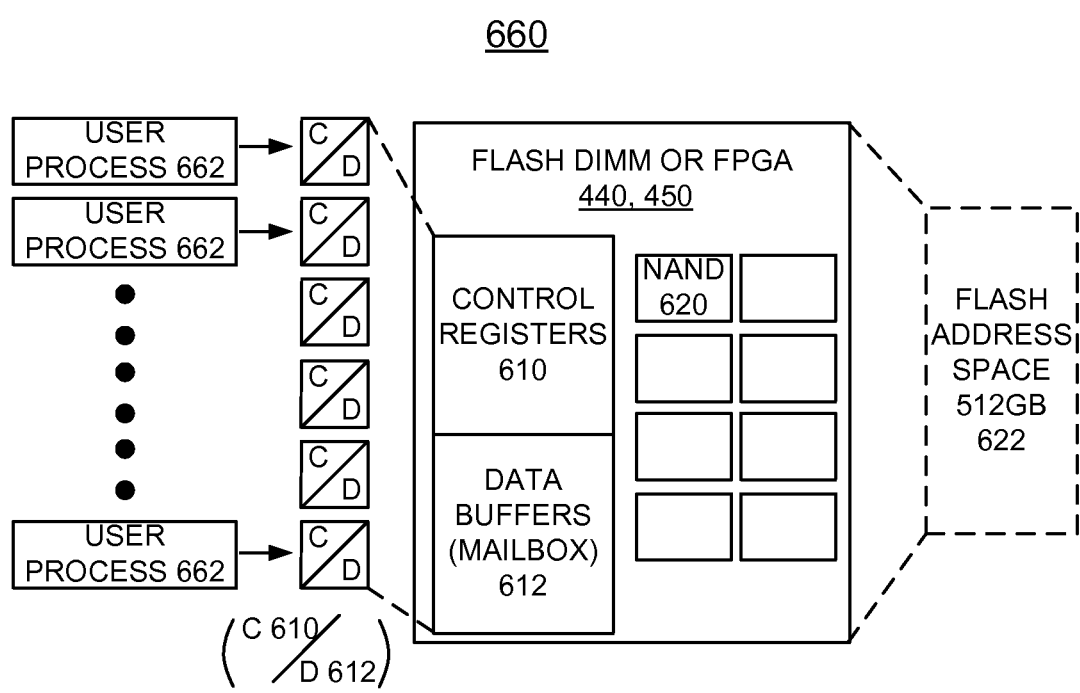
FIG. 6D is a diagram illustrating the device address space mapped and direct access for data movement using control registers and data buffers in the example system of FIG. 4 in accordance with the preferred embodiment.

Referring to FIG. 6D there is shown a diagram illustrating a data movement method generally designated by the reference character 660 using device address space mapped and direct access in the example system 400 with a flash 440 or FPGA 450 in accordance with the preferred embodiment. A plurality of user processes 662, are enabled, such as with thousands of user mode C 610, D 612 spaces or control registers 610 and data buffers 612 where each C 610, D 612 space provided, for example with NAND flash 620 manages a different section of flash address space 622. Each C 610, D 612 space is protected from unauthorized access by page tables/TLB enforced by the MMU 508.

Figure 7:
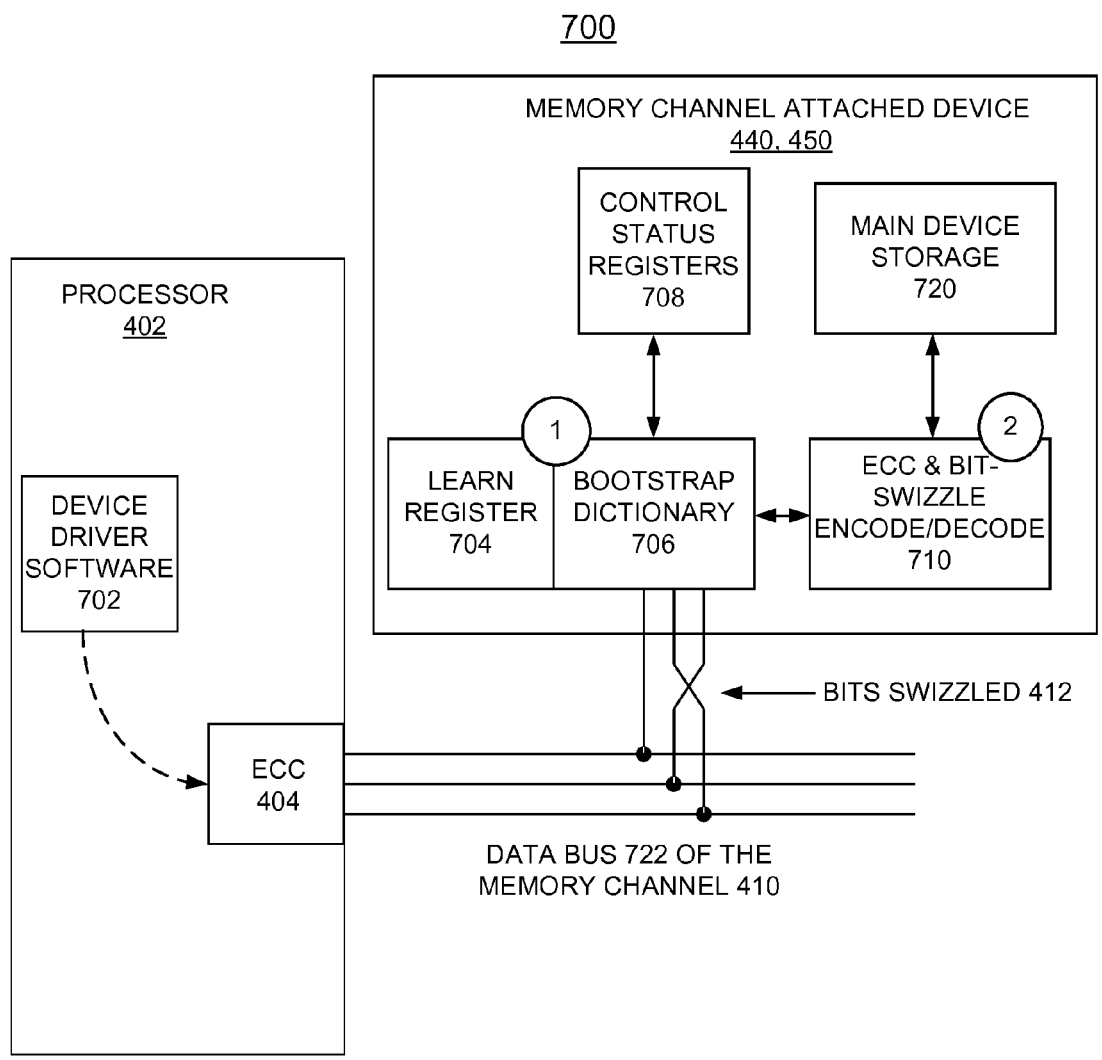
FIG. 7 is a diagram illustrating circuitry for translating ECC encoded and bit-swizzled values on the memory bus in the example system of FIG. 4 in accordance with the preferred embodiment.

Referring to FIG. 7 there is shown a diagram illustrating circuitry generally designated by the reference character 700 for translating ECC encoded and bit-swizzled values on the memory bus in the example system 400 in accordance with the preferred embodiment. ECC encoded and bit-swizzled circuitry 700 is required because the non-DRAM devices 440, 450 may generate their own data unlike the DRAM devices 406 that store only the data generated by the processor 402. When a non-DRAM device, such as flash 440 or FPGA 450 generates its own data words, it must be able to append the correct ECC bits to the word, so that the processor 402 does not generate a machine check exception (MCE). The flash 440 or FPGA 450 must be able to also un-swizzle the signals on the wires of channel 410 so that the data words pass processor ECC checks and that the data words do not confuse the software processes using it, using for example, a bootstrapping step, in which the device driver discovers minimal amount of ECC and bit-swizzling permutation logic, sufficient enough for the driver to establish read/write communication with the device control/status registers, and a whole ECC/bit-swizzle discovery step, in which the device driver software 702 running on the processor 402 discovers the whole ECC and bit-swizzle logic by writing to the device 440, 450, and then by reading and writing the device control and status registers.

In FIG. 7, ECC encoded and bit-swizzled circuitry 700 includes a learn register 704, a bootstrap dictionary 706, control and status registers 708 to bootstrap the memory channel attached device 440, 450; and the device driver software 702 that runs the discovery software and embeds the discovery knowledge in the ECC and bit-swizzle decode logic 710 coupled to main device storage 720 on the device 440,450.

Figure 8:
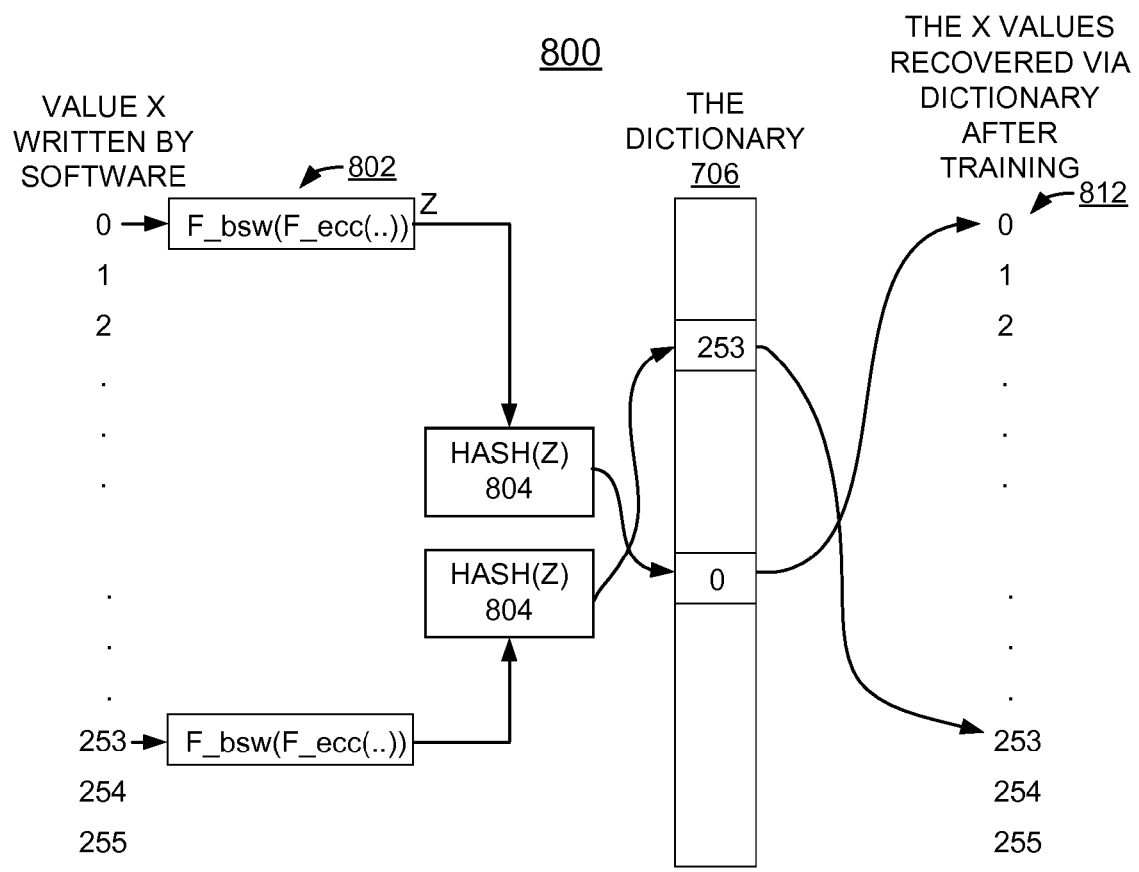
FIG. 8 is a diagram illustrating the Bootstrap Dictionary for translating ECC encoded and bit-swizzled values on the memory bus to their intended meaning in the example system of FIG. 4 in accordance with the preferred embodiment.

Referring also to FIG. 8 there is shown a diagram illustrating the Bootstrap Dictionary method generally designated by the reference character 800 for translating ECC encoded and bit-swizzled values on the memory bus to their intended meaning in the example system 400 in accordance with the preferred embodiment. The key element of the bootstrap step is the bootstrap dictionary 706 or dictionary 706 that translates the ECC encoded and bit-swizzled data words to their intended meaning. Utility of the dictionary 706 and the method may be best described using a mathematical notation. When a software process on processor 402 writes a value of X to the memory attached device, as indicated by 802 in FIG. 8, the ECC circuitry 404 transforms the value in to another value Y, where Y=F_ecc(X) denotes that Y is a function of F_ecc( . . . ) whose input is X. A key to the invention is that the device designers do not know about F_ecc ahead of time, and the method described here discovers F_ecc. Y is then transformed in to Z by potential bit-swizzling 412 operation on the channel, where Z=F_bsw(Y) denotes that Z is a function of F_bsw( . . . ) whose input is Y. A hash function HASH(Z) 804 applies Z value that are hashed to the dictionary locations during training. During training the implied value X=0 . . . 255 are stored in the dictionary 706 therefore obtaining a mapping. The X values recovered via the dictionary 706 after training as indicated by 812 in FIG. 8.

In some embodiments, the function F_ecc depends not only on the data X that one wants to store, but also on the address A where we want to store it. The present invention provides for the automatic discovery of such F_ecc function as well. In some exemplary embodiments, the F_ecc function is a linear function of the bits comprising X and the bits comprising the address A; by linear in this context we mean that if one wanted to encode the message X_1 XOR X_2 in an address A_1 XOR A_2, then one can in principle find the encoding via the equation F_ecc(X_1 XOR X_2, A_1 XOR A_2)=F_ecc(X_1,A_1) XOR F_ecc(X_2,A_2). In such situations, to discover the F_ecc function it suffices to send as many test patterns as bits in the X and A vectors together, each test pattern equal to zero in all bits but a single position which is changed as one varies the test pattern. The fundamental advantage of this aspect of the present invention here is then that it is not necessary to test every possible location in memory to discover the dependence of F_ecc on the address. It must be noted that even if the F_ecc function does not depend on all of the bits of the address A, the procedure described above will discover automatically which bits F_ecc does depend on and which ones it does not.

In sum, between the processor 402 and the device 440, 450, the value of X is transformed in to another value Z, where Z=F_bsw(F_ecc(X)) 802, 804 when the data signal finally arrives at the device. The main purpose of the dictionary 706 is to transform the value Z back to X which is what the software intended to write to the device. In essence, the Dictionary implements an inverse function X=G(Z), where G(...)=F_inverse_bsw(F_inverse_ecc(...)). The dictionary 706 is implemented on the device 440, 450 for example as a small table of values that maps values of Z to values of X. This table 706 is populated by values in a method step called training the dictionary 706. The control and status registers 708 on the device 440, 450 are designed, for example as 1 byte wide, which allows 256 distinct values (0 to 255) to be read and written from those registers 708. Those skilled in the art will recognize that other data widths and ranges are possible. Note that before the training has completed, no register on the device should be read, except the LEARN register 802. Until the training is completed, the LEARN register will only return what was written to it earlier therefore the LEARN register cannot cause an ECC error. As illustrated in FIG. 8, dictionary training steps as executed by the device driver software are the following:

1. The device driver software 702 starts the dictionary training by writing any known value, for example 0, to the LEARN register 704.

2. The device driver software 702 then starts writing the sequence of numbers 0, 1, 2, 3 ..., 254, and 255 to a dedicated register in the dictionary 706. This sequence has been agreed upon the device driver 702 and the device 440, 450 at design time. Therefore, as the device 440, 450 is receiving those numbers, even though the values are scrambled by the processor ECC circuitry 404 and bit-swizzle 412, the device knows implicitly that the sequence 0 ... 255 is being transmitted from the processor.

3. The device driver software 702 reads the LEARN register 802 and compares it to the previously written value in Step 1, for example 0.

4. If the two values are identical, then the training has not completed and therefore the software repeats the steps starting from Step 1.

5. If the value are different, then the training has completed.

Once the training has completed, it means that the dictionary 706 in essence knows how to translate all 1-byte wide values to their original and therefore the control and status registers 708 of the device 440, 450 can be accessed freely.

Figure 9:
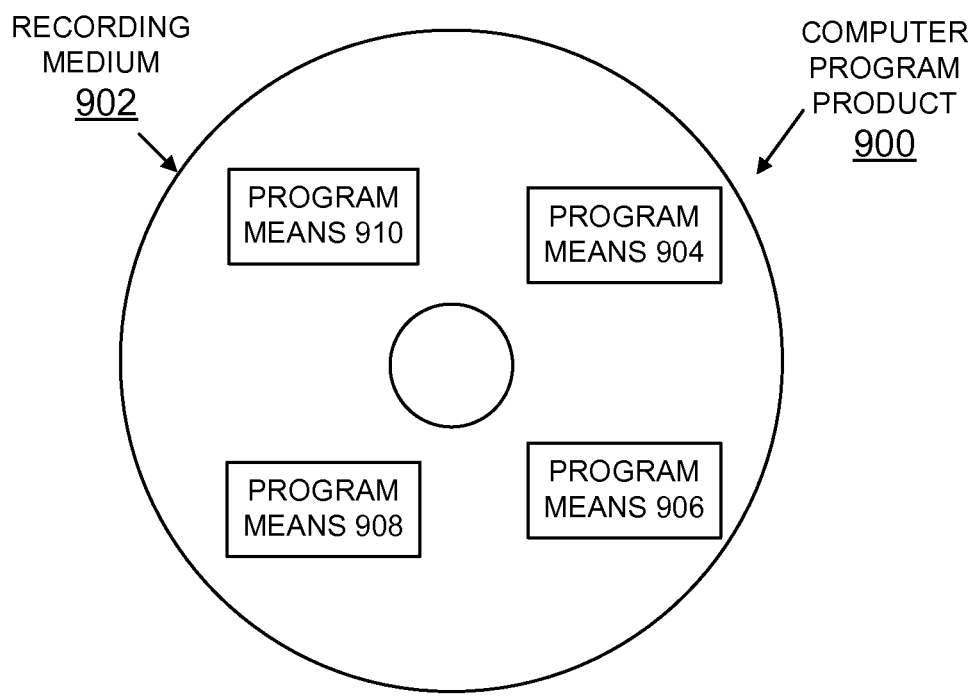
FIG. 9 is a block diagram illustrating a computer program product in accordance with the preferred embodiment.

Referring now to FIG. 9, an article of manufacture or a computer program product 900 of the invention is illustrated. The computer program product 900 is tangibly embodied on a non-transitory computer readable storage medium that includes a recording medium 902, such as, a floppy disk, a high capacity read only memory in the form of an optically read compact disk or CD-ROM, a tape, or another similar computer program product. Recording medium 902 stores program means 904, 906, 908, and 910 on the medium 902 for carrying out the methods for implementing attachment of user mode foreign devices 440, 450 to a memory channel 410 of the preferred embodiment in the system 400 of FIG. 4.

A sequence of program instructions or a logical assembly of one or more interrelated modules defined by the recorded program means 904, 906, 908, and 910, direct the computer system 400 for implementing attachment of user mode foreign devices 440, 450 to a memory channel 410 of the preferred embodiment.

While the present invention has been described with reference to the details of the embodiments of the invention shown in the drawing, these details are not intended to limit the scope of the invention as claimed in the appended claims.

What is claimed is:

1. A method for implementing attachment of a user mode foreign device to a memory channel in a computer system comprising:
    attaching the user mode foreign device to the memory channel;
    using memory mapping of device registers and device buffers on the user mode foreign device to a processor address space;
    doubly mapping storage capacity on the user mode foreign device in the processor address space creating separate control and data address spaces to allow user mode processes to control the user mode foreign device;
    providing a processor Memory Management Unit (MMU) to coordinate multiple user processes accessing the device registers and buffers providing address space protection, and shifting device protection to the processor MMU from system software; and
    wherein the user mode foreign device implementing bit-swizzling permutations.

2. The method as recited in claim 1 wherein the user mode foreign device includes a flash storage device.

3. The method as recited in claim 1 wherein the user mode foreign device includes a Field Programmable Gate Array (FPGA).

4. The method as recited in claim 1 includes enabling the user mode foreign device to un-swizzle signals on wires of the memory channel.

5. The method as recited in claim 1 includes providing a device interface separated as control pages and data pages.

6. The method as recited in claim 5 includes multiple software processes controlling device operation through respective control pages and accessing device data through respective data pages.

7. A method for implementing attachment of a user mode foreign device to a memory channel in a computer system comprising:
    attaching the user mode foreign device to the memory channel;
    using memory mapping of device registers and device buffers on the user mode foreign device to a processor address space;
    doubly mapping storage capacity on the user mode foreign device in the processor address space creating separate control and data address spaces to allow user mode processes to control the user mode foreign device;
    providing a processor Memory Management Unit (MMU) to coordinate multiple user processes accessing the device registers and buffers providing address space protection, and shifting device protection to the processor MMU from system software;

wherein the user mode foreign device implementing ECC algorithm parameter; and enabling the user mode foreign device to generate ECC bits and append the generated ECC bits to data.

8. A system for implementing attachment of a user mode foreign device to a memory channel in a computer system comprising:

the user mode foreign device attached to the memory channel;

the user mode foreign device including a plurality of device registers and device buffers on the user mode foreign device memory for mapping to a processor address space, and doubly mapping storage capacity on the user mode foreign device in the address space creating separate control and data address spaces to allow user mode processes to control the user mode foreign device; a learn register and a bootstrap dictionary in the user mode foreign device discovering ECC algorithm parameters, said bootstrap dictionary in the channel attached device enables the user mode foreign device to generate ECC bits and append the generated ECC bits to data; and a processor Memory Management Unit (MMU) coordinating multiple user processes accessing the device registers and buffers and providing address space protection, shifting device protection to the processor MMU from system software.

9. The system as recited in claim 8 wherein the user mode foreign device includes a flash storage device.

10. The system as recited in claim 8 wherein the user mode foreign device includes a Field Programmable Gate Array (FPGA).

11. The system as recited in claim 8 includes an ECC and bit swizzle encode/decode in the user mode foreign device discovering bit permutations on the memory channel.

12. The system as recited in claim 11 wherein said ECC and bit swizzle encode/decode in the user mode foreign device enables at least data permutation to be reversed upon reception of the data at the device.

13. The system as recited in claim 11 wherein said ECC and bit swizzle encode/decode in the user mode foreign device enables the user mode foreign device to un-swizzle signals on wires of the memory channel.

14. The system as recited in claim 8 wherein the user mode foreign device includes a device interface separated as control pages and data pages.

15. The system as recited in claim 14 includes multiple software processes controlling device operation through respective control pages and accessing device data through respective data pages.

16. The system as recited in claim 14 wherein said processor Memory Management Unit (MMU) providing address space protection of said device interface.

* * * * *